United States Patent
Biskeborn et al.

(10) Patent No.: US 10,062,398 B1
(45) Date of Patent: *Aug. 28, 2018

(54) MAGNETIC HEAD HAVING ARRAYS OF TUNNEL VALVE READ TRANSDUCERS

(71) Applicant: International Business Machines Corporation, Armonk, NY (US)

(72) Inventors: Robert G. Biskeborn, Hollister, CA (US); Hugo E. Rothuizen, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,870

(22) Filed: Feb. 28, 2017

(51) Int. Cl.
 *G11B 5/39* (2006.01)
 *G11B 15/46* (2006.01)
 *G11B 5/008* (2006.01)
 *G11B 5/23* (2006.01)

(52) U.S. Cl.
 CPC ........ *G11B 5/3912* (2013.01); *G11B 5/00813* (2013.01); *G11B 5/23* (2013.01); *G11B 5/3906* (2013.01); *G11B 5/3909* (2013.01); *G11B 5/3932* (2013.01); *G11B 5/3948* (2013.01); *G11B 5/3951* (2013.01); *G11B 15/46* (2013.01)

(58) Field of Classification Search
 CPC ... G11B 5/3906; G11B 5/3909; G11B 5/3912; G11B 5/3932; G11B 5/3948; G11B 5/3958
 USPC ................. 360/316, 324.12, 324.2
 See application file for complete search history.

(56) References Cited

U.S. PATENT DOCUMENTS

| | | | |
|---|---|---|---|
| 6,473,279 B2 | 10/2002 | Smith et al. | |
| 7,072,154 B2 | 7/2006 | Gill et al. | |
| 7,092,220 B2 | 8/2006 | Gill et al. | |
| 9,042,059 B1 * | 5/2015 | Katine | G11B 5/3909 360/316 |
| 9,396,745 B2 * | 7/2016 | MacKen | G11B 5/3958 |
| 9,449,622 B2 | 9/2016 | Biskeborn et al. | |
| 9,608,226 B2 | 3/2017 | Suematsu et al. | |
| 9,990,944 B1 | 6/2018 | Biskeborn et al. | |

(Continued)

OTHER PUBLICATIONS

Iskeborn et al., U.S. Appl. No. 15/445,877, filed Feb. 28, 2017.

(Continued)

*Primary Examiner* — Jefferson Evans
(74) *Attorney, Agent, or Firm* — Zilka-Kotab, P.C.

(57) ABSTRACT

An apparatus, according to one embodiment, includes: a module, and a plurality of tunnel valve read transducers arranged in an array extending along the module. Each of the tunnel valve read transducers includes: a sensor structure, an upper magnetic shield, a lower magnetic shield, an upper conducting spacer layer between the sensor structure and the upper magnetic shield, a lower conducting spacer layer between the sensor structure and the lower magnetic shield, and electrically insulating layers on opposite sides of the sensor structure. The sensor structure includes a cap layer, a free layer, a tunnel barrier layer, a reference layer and an antiferromagnetic layer. Moreover, a height of the free layer measured in a direction perpendicular to a media bearing surface of the module is less than a width of the free layer measured in a cross-track direction perpendicular to an intended direction of media travel.

20 Claims, 14 Drawing Sheets

(56) References Cited

U.S. PATENT DOCUMENTS

| | | | | |
|---|---|---|---|---|
| 2005/0052789 | A1* | 3/2005 | Zhang | G11B 5/31 |
| | | | | 360/324.2 |
| 2007/0230062 | A1 | 10/2007 | Maejima et al. | |
| 2008/0182133 | A1* | 7/2008 | Shiimoto | B82Y 10/00 |
| | | | | 428/811.2 |
| 2010/0232066 | A1* | 9/2010 | Hara | B82Y 10/00 |
| | | | | 360/234.3 |
| 2011/0007426 | A1* | 1/2011 | Qiu | G11B 5/3932 |
| | | | | 360/313 |
| 2011/0069413 | A1* | 3/2011 | Maat | B82Y 10/00 |
| | | | | 360/234.3 |
| 2014/0293474 | A1* | 10/2014 | Yamane | G11B 5/3932 |
| | | | | 360/75 |
| 2015/0062752 | A1* | 3/2015 | Hong | H01L 43/02 |
| | | | | 360/234.3 |
| 2015/0255092 | A1 | 9/2015 | Macken et al. | |
| 2015/0269956 | A1* | 9/2015 | Isowaki | G11B 5/3954 |
| | | | | 360/46 |
| 2015/0325260 | A1 | 11/2015 | Singleton et al. | |
| 2017/0365280 | A1* | 12/2017 | Batra | G11B 5/3977 |

OTHER PUBLICATIONS

List of IBM Patents or Patent Applications Treated as Related.
Non-Final Office Action from U.S. Appl. No. 15/445,877, dated Jul. 28, 2017.
Final Office Action from U.S. Appl. No. 15/445,877, dated Nov. 17, 2017.
Notice of Allowance from U.S. Appl. No. 15/445,877, dated Feb. 2, 2018.
Biskeborn et al., U.S. Appl. No. 15/938,981, filed Mar. 28, 2018.
Biskeborn et al., U.S. Appl. No. 15/994,757, filed May 31, 2018.

* cited by examiner

MAGNETIC HEAD HAVING ARRAYS OF TUNNEL VALVE READ TRANSDUCERS

BACKGROUND

The present invention relates to data storage systems, and more particularly, this invention relates to magnetic tape heads having tunnel valve read transducers with tunnel magnetoresistive (TMR) sensor configurations which achieve reduced magnetic noise.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

Minimization of the spacing between the head and the tape, however, induces frequent contact between the tape and the media facing side of the head, causing tape operations to be deemed a type of contact recording. This contact, in view of the high tape speeds and tape abrasivity, quickly affects the integrity of the materials used to form the media facing surface of the head, e.g., causing wear thereto, smearing which is known to cause shorts, bending ductility, etc. Furthermore, shorting may occur when an asperity of the tape media drags any of the conductive metallic films near the sensor across the tunnel junction.

Implementing TMR sensor configurations to read from and/or write to magnetic tape has also reduced the shield-to-shield spacing which allows for more detailed reading and/or writing to magnetic tape by allowing the linear density of transitions on tape to increase. However, this increase has not come without drawbacks. For instance, at smaller dimensions, conventional free layers have proven to be magnetically unstable, thereby introducing magnetic switching noise.

SUMMARY

An apparatus, according to one embodiment, includes: a module, and a plurality of tunnel valve read transducers arranged in an array extending along the module. Each of the tunnel valve read transducers includes: a sensor structure, an upper magnetic shield, a lower magnetic shield, an upper conducting spacer layer between the sensor structure and the upper magnetic shield, a lower conducting spacer layer between the sensor structure and the lower magnetic shield, and electrically insulating layers on opposite sides of the sensor structure. The sensor structure includes a cap layer, a free layer, a tunnel barrier layer, a reference layer and an antiferromagnetic layer. Moreover, a height of the free layer measured in a direction perpendicular to a media bearing surface of the module is less than a width of the free layer measured in a cross-track direction perpendicular to an intended direction of media travel.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof, which include improved free layer performance. Shape anisotropy resulting from free layer dimensions and/or the introduction of hard bias magnets as described herein may be able to provide a desirable level of stabilization to the free layer, and thereby achieve unexpected improvements over conventional implementations, e.g., as will be described in further detail below.

In one general embodiment, an apparatus includes: a module, and a plurality of tunnel valve read transducers arranged in an array extending along the module. Each of the tunnel valve read transducers includes: a sensor structure, an upper magnetic shield, a lower magnetic shield, an upper conducting spacer layer between the sensor structure and the upper magnetic shield, a lower conducting spacer layer between the sensor structure and the lower magnetic shield, and electrically insulating layers on opposite sides of the sensor structure. The sensor structure includes a cap layer, a free layer, a tunnel barrier layer, a reference layer and an antiferromagnetic layer. Moreover, a height of the free layer measured in a direction perpendicular to a media bearing surface of the module is less than a width of the free layer measured in a cross-track direction perpendicular to an intended direction of media travel.

Figure 1A:
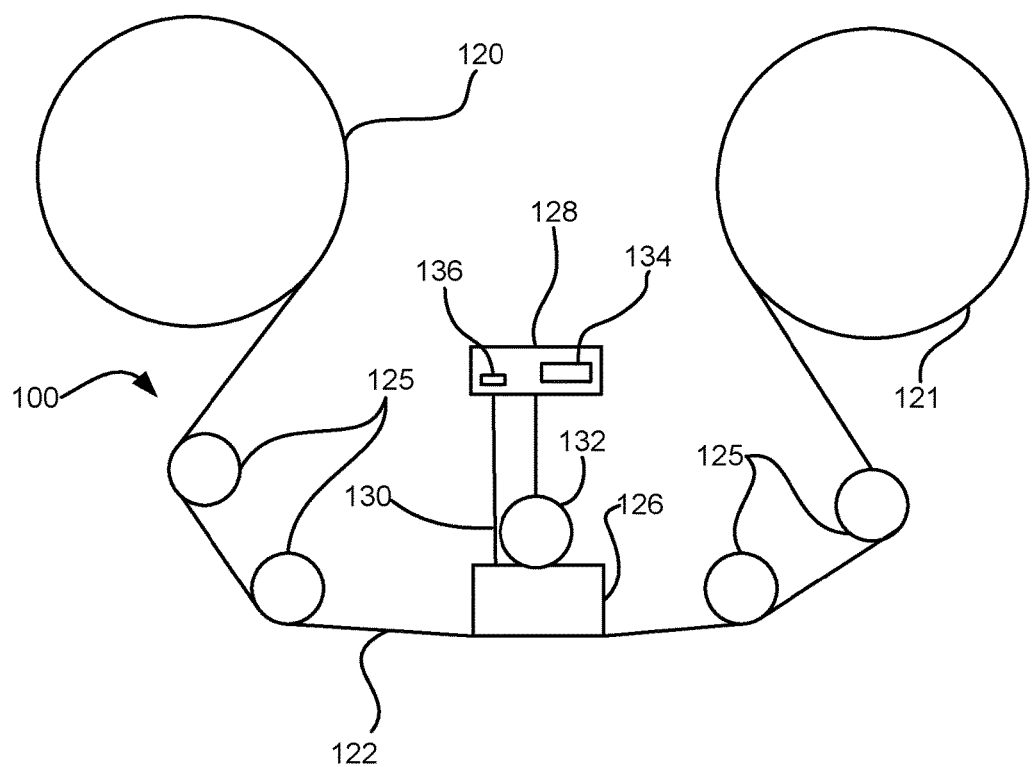
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
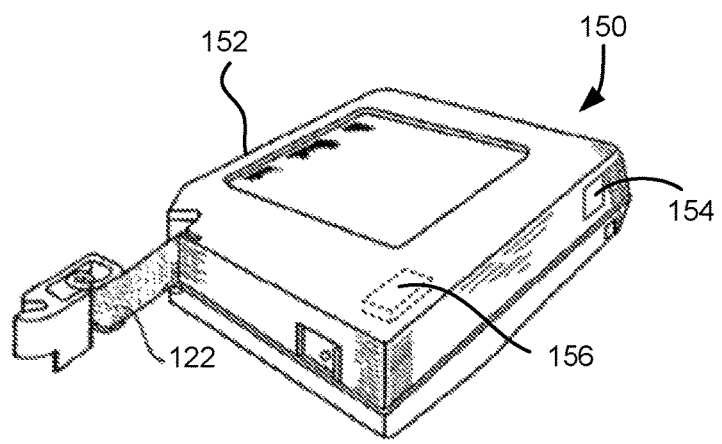
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
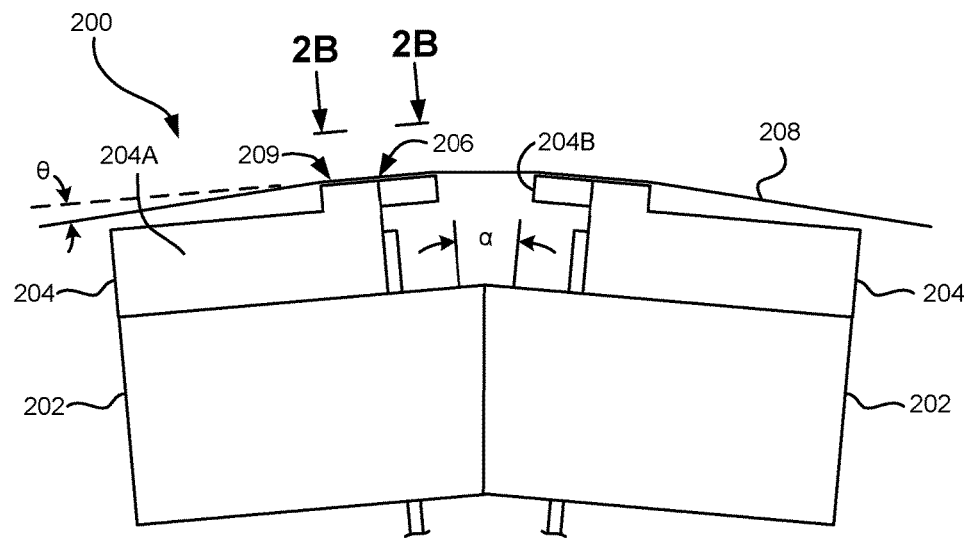
FIG. 2A is a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration includes a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration includes one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
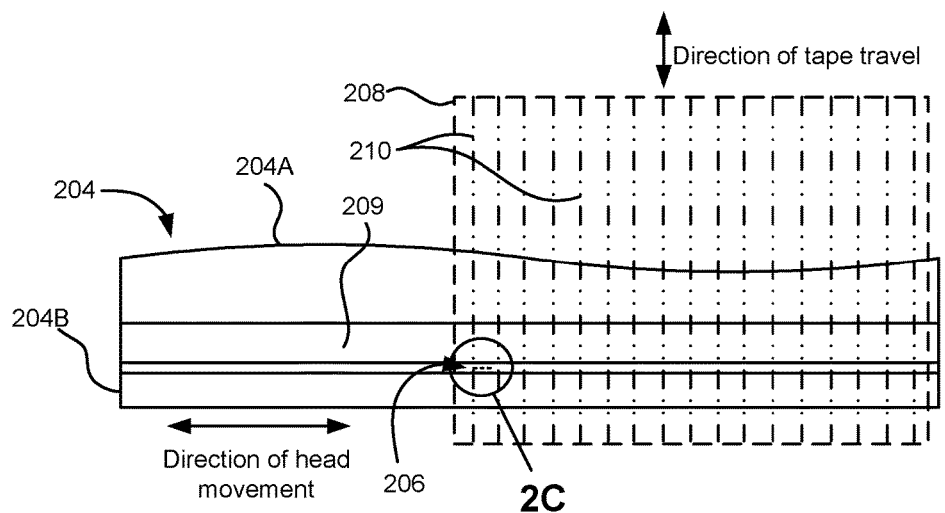
FIG. 2B is a tape facing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
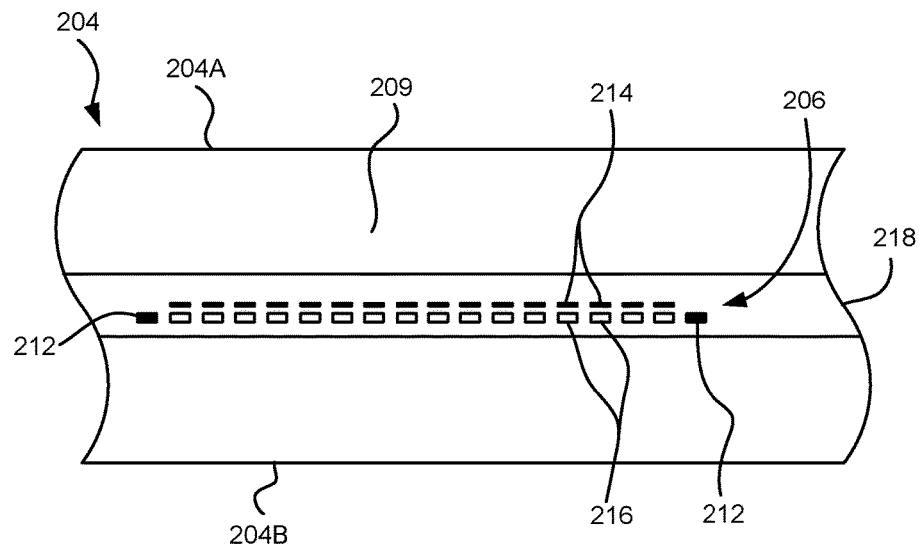
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
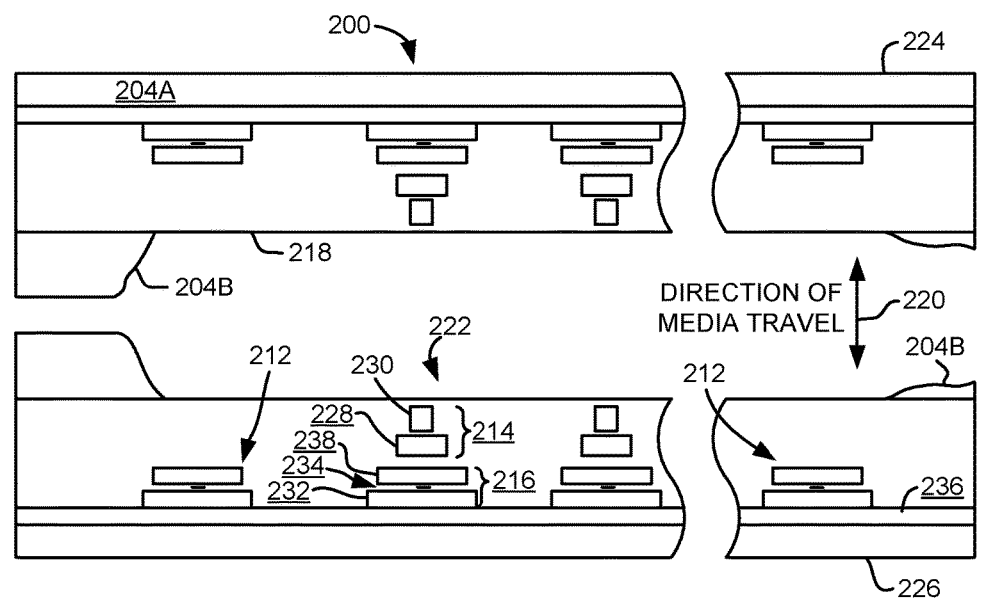
FIG. 2D is a detailed view of a partial tape facing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, TMR, etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3:
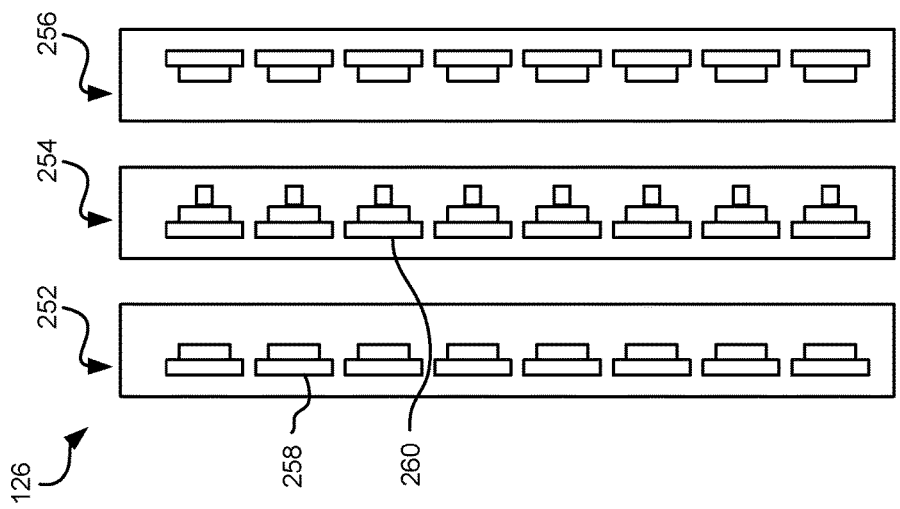
FIG. 3 is a partial tape facing surface view of a magnetic head having a write-read-write configuration.
Figure 4:
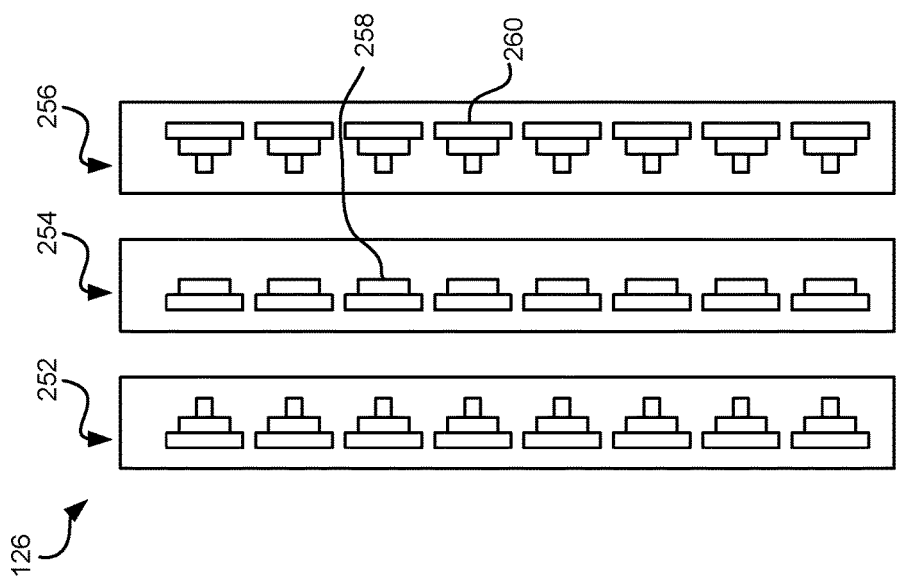
FIG. 4 is a partial tape facing surface view of a magnetic head having a read-write-read configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
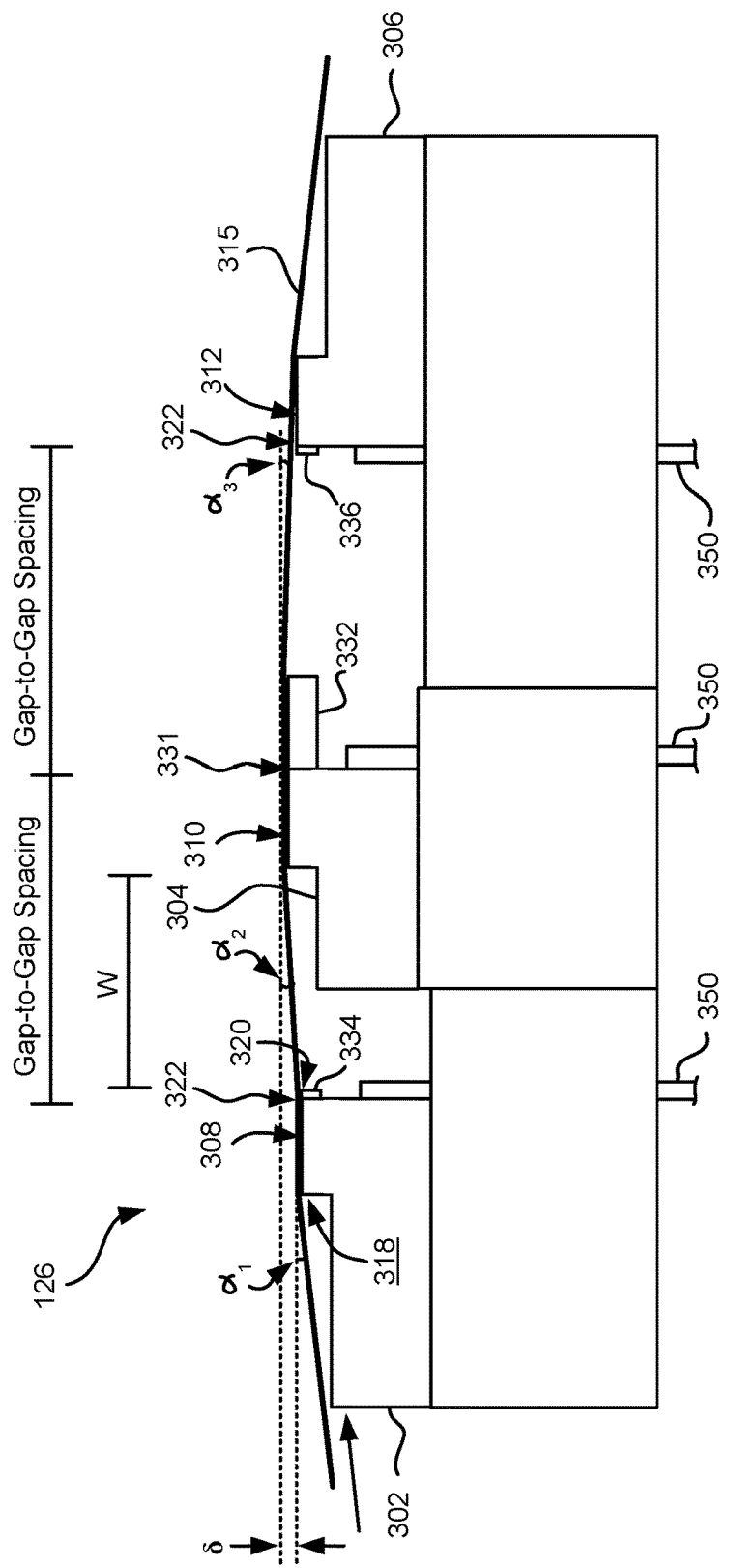
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
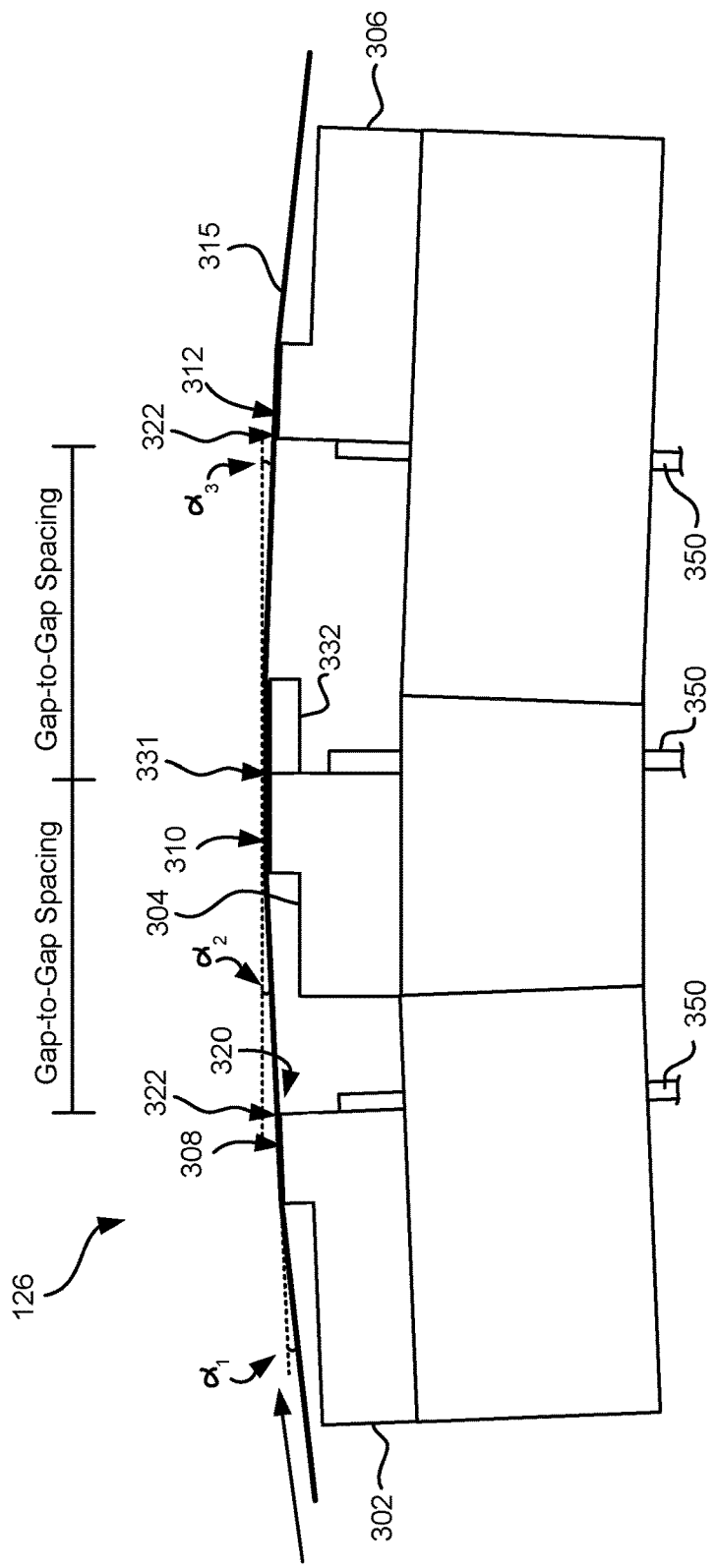
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
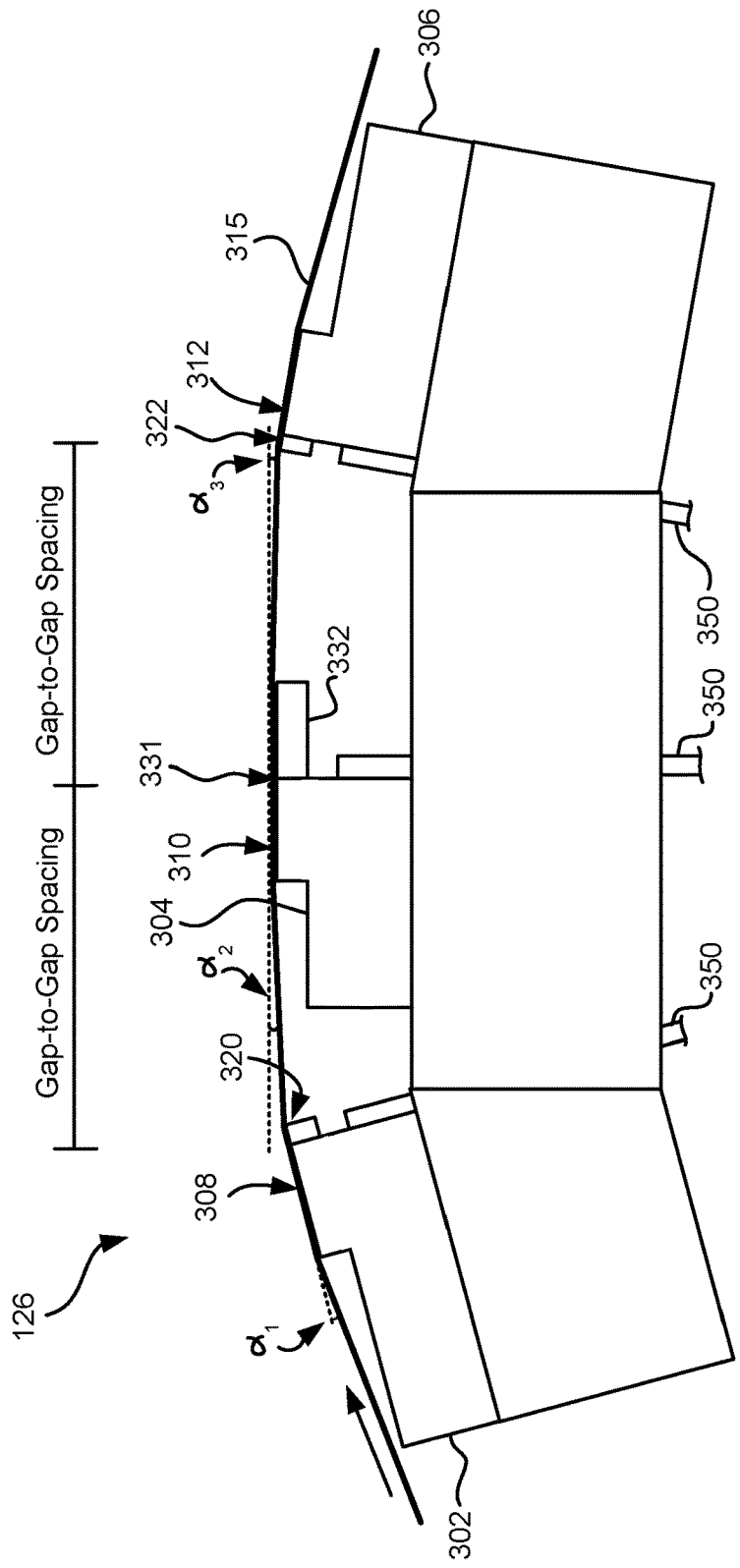
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
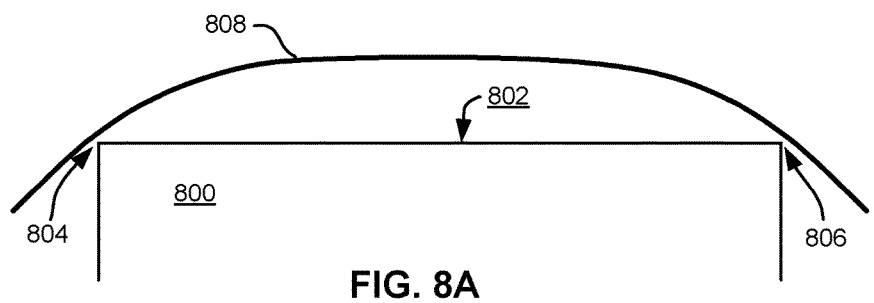
FIGS. 8A-8C are schematics depicting the principles of tape tenting.
Figure 8B:
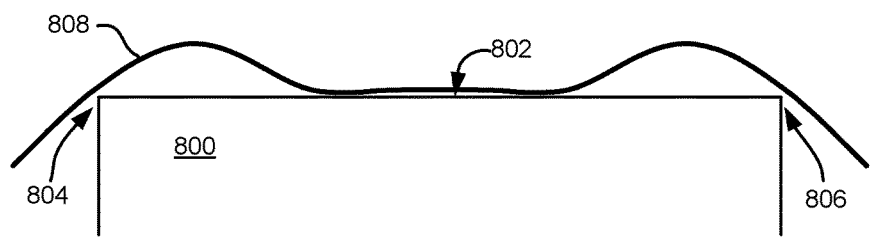
Figure 8C:
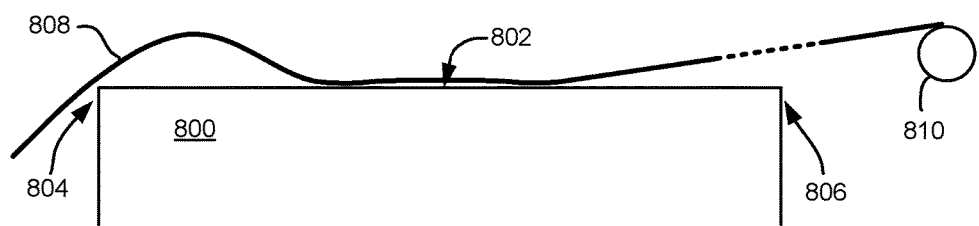

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
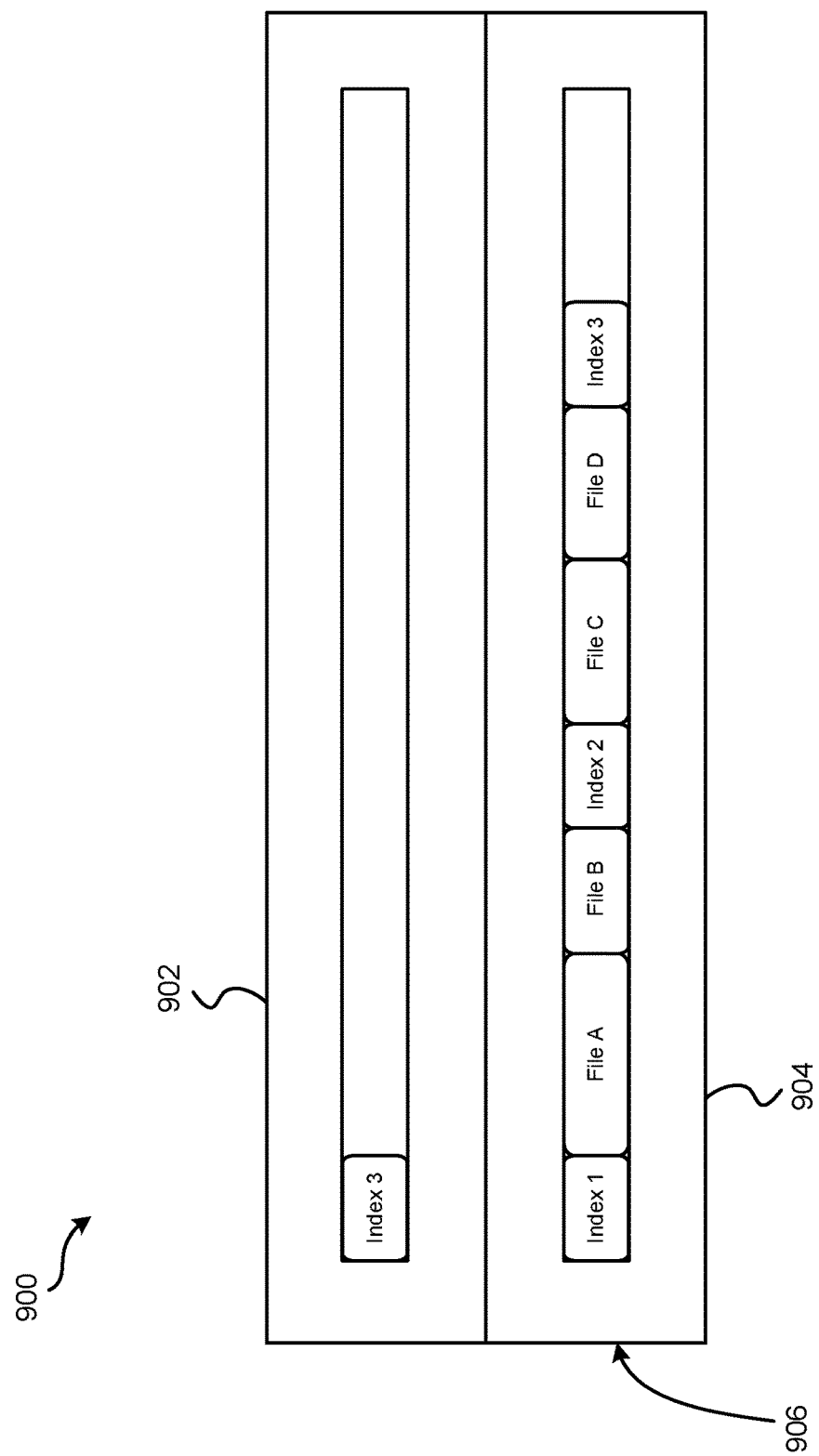
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 differently depending on the desired embodiment. According to some embodiments, the metadata of the index partition 902 may be updated in response to the tape being unmounted, e.g., such that the index may be read from the index partition when that tape is mounted again. The metadata may also be written in the data partition 902 so the tape may be mounted using the metadata recorded in the data partition 902, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As alluded to above, there is a need to address the issue of magnetic noise as experienced in conventional magnetic tape heads due to thermally and/or magnetically induced switching of unstable domains in free layers thereof. To overcome such issues, some of the embodiments included herein provide magnetic tape heads which include modules having tunnel valve transducers with free layers having favorable dimensions in order to achieve shape anisotropy. Moreover, other embodiments included herein provide magnetic tape heads which include modules having tunnel valve transducers with hard bias magnets. It follows that various embodiments included herein achieve a resulting structure which is both structurally and functionally different than those seen in conventional tape and/or hard disk drive (HDD) heads.

In order to operate as a magnetic sensor with a linear and symmetric response, the magnetization throughout the free layer slab should ideally constitute a single domain and be aligned to the specific direction for which the rest of the sensor layers are configured at zero applied sense field. Although it is preferred that the aforementioned "specific direction" is the cross-track direction 1052, it may vary depending on the specific embodiment. Moreover, this state of alignment is also preferably energetically stable, such that it is restored after an external sensing field (e.g. from magnetized tape) is applied and then removed again.

As described herein, free layer slab dimensions may be able to cause the free layer to form a largely homogeneous single magnetic domain aligned along the cross-track direction as a result of shape anisotropy. This may directly result in improved sensor performance and overall increased efficiency of a magnetic head, thereby achieving a significant improvement compared to conventional implementations.

However, in some instances, such as sensors having non-ideal shape anisotropy may also give rise to distortions of the magnetic alignment near the lateral edges of the domain. In these edge regions, the free layer magnetization may be locally torqued by demagnetizations fields towards a direction perpendicular to the air-bearing surface. Energetically, this causes bifurcation in the magnetic state at the lateral edges, and switching between these states may occur under the impulse of an external field transient (e.g. fringing fields from written tape traveling thereover) and/or thermal agitation. Such switching events undesirably translate into noise in the readback signal.

Biasing the entire free layer to this state of alignment may serve as a first purpose for using hard bias magnets in such instances, particularly as free layer slab dimensions typical for sensors in HDDs may not able to form a magnetization which is sufficiently homogeneous, and with a singly-aligned domain absent the implementation of hard bias magnets.

A further purpose of implementing hard bias magnets is to subject these distorted edge regions of the free layer to a magnetic field which favors torqueing their magnetic orientation back to being about parallel to the cross-track direction. The magnetic field from the hard bias magnets is preferably strong enough to dominate over the local demagnetization fields. The resulting magnetization of the free layer may thereby be influenced such that it constitutes a more homogeneous single domain. The edge regions may also be stabilized in the sense that they are held to this orientation and bifurcated-energy states are suppressed.

Applying a relatively weak magnetic bias to the edge regions of a free layer may create more split states resulting in an upshift of the spectral response of noise in the sensor, especially absent desirable shape anisotropy. However, increasing magnetic hard bias strength to overcome this may attenuate signal sensitivity. Thus, choosing the strength of the hard bias magnets involves a compromise between noise and signal strength. For instance, implementing relatively stronger hard bias magnets may decrease the sensitivity of the free layer particularly in the edge regions (which are a significant source of noise), but may also shift the spectral characteristics of the noise processes such that system signal to noise ratio (SNR) is less affected. Conversely, while relatively weaker hard bias magnets allow for retaining better overall signal sensitivity, it comes at a cost in noise performance due to a less homogeneous free layer domain which may include states between which switching can occur.

For reference, sensors implemented in HDDs have small width dimensions (about 50 nm) compared to the length scale of flux leakage toward the shields, resulting in little variation of the field strength from the hard bias across the width of the HDD sensor. There is therefore little latitude to engineer a high-susceptibility sensing region at the center of the free layer separate from low-susceptibility regions at the edges. Overall sensitivity being at a premium for HDDs, the compromise may generally gravitate towards implementing a moderate-to-small strength hard bias.

On the contrary, magnetic sensors for magnetic tape typically have widths that are much larger than the length scale of flux leakage towards the shields. According to an example, the width of a magnetic tape sensor may be about 1.5 µm, while the length scale of flux leakage towards the shields may be about 200 nm for a shield to shield spacing of about 100 nm. As a result, the outer edge regions of a free layer in the sensor stack may be strongly anchored in order to reduce noise. Moreover, this may be achieved while also exploiting the relatively steep decay of the hard bias field strength over distance from the free layer edges, thereby leaving the susceptibility largely unmodified near the central region of the free layer along its longitudinal axis. As a result, the effective magnetic width and the signal output of the sensor may be decreased moderately, e.g., by an amount in proportion with the width of the edge regions, whereas its noise performance may be significantly improved.

It follows that hard bias magnets may be used to stabilize a free layer and reduce magnetic switching noise in some of the embodiments described herein. However, due to the reduced field overlap between hard bias magnet pairs, and given that the peak bias strength corresponding to achieving optimal biasing conditions for a tape sensor is likely larger than that for an HDD, desirable biasing strengths are not achievable for tape simply by performing incremental changes to conventional HDD hard bias geometry. In sharp contrast to traditional structures and conventional wisdom, various embodiments described herein include new geometric characteristics for free layers and hard bias layers, each of which are able to achieve substantial improvements over conventional implementations, e.g., as will be described in further detail below.

Figure 10A:
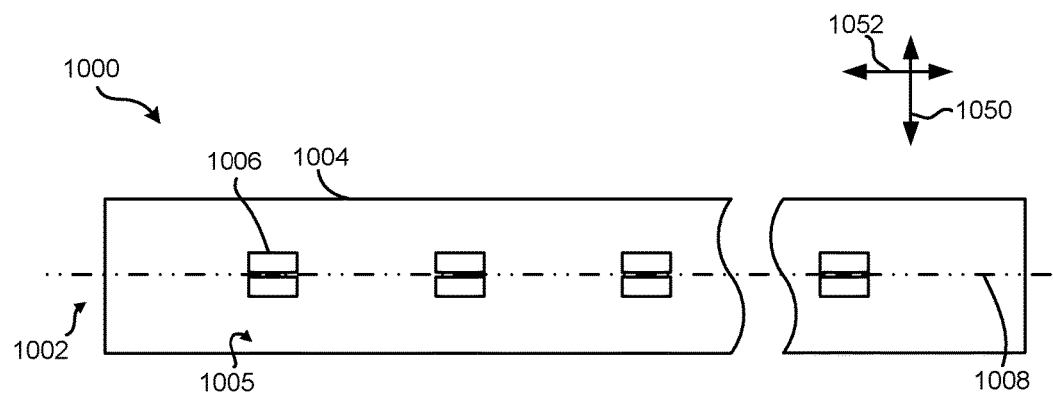
FIG. 10A is a partial tape facing surface view of a magnetic tape head according to one embodiment.
Figure 10B:
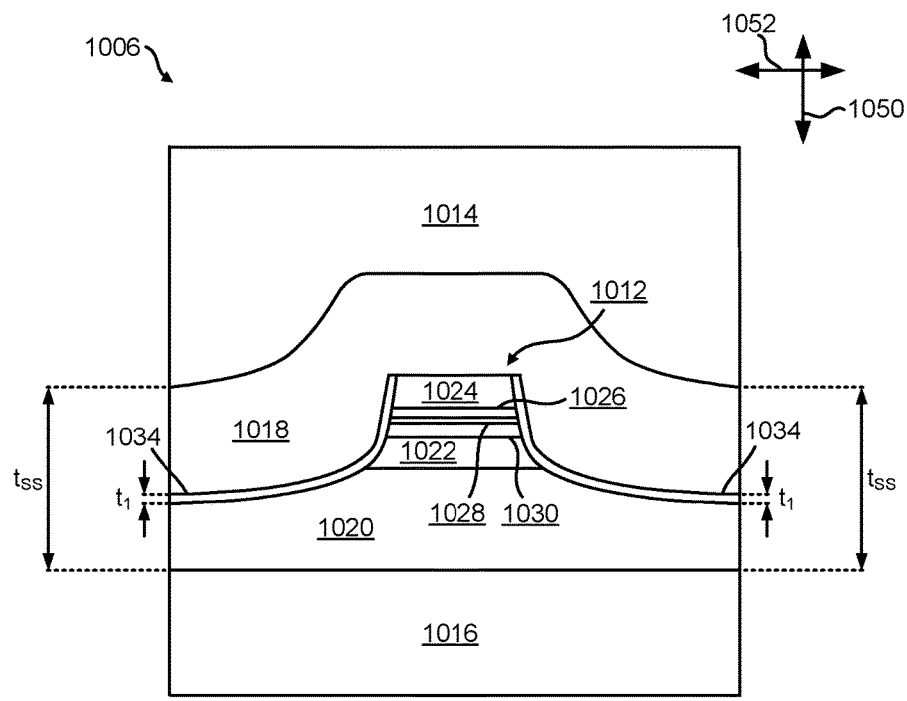
FIG. 10B is a partial detailed tape facing surface view of a tunnel valve read transducer from FIG. 10A.

FIGS. 10A-10B depict an apparatus 1000 in accordance with one embodiment. As an option, the present apparatus 1000 may be implemented in conjunction with features from any other embodiment listed herein, such as those described with reference to the other FIGS. However, such apparatus 1000 and others presented herein may be used in various applications and/or in permutations which may or may not be specifically described in the illustrative embodiments listed herein. Further, the apparatus 1000 presented herein may be used in any desired environment. Thus FIGS. 10A-10B (and the other FIGS.) may be deemed to include any possible permutation.

It should also be noted that additional layers may be present, and unless otherwise specified, the various layers in this and other embodiments may be formed using conventional processes. Additionally, the different figures are not drawn to scale, but rather features may have been exaggerated to help exemplify the descriptions herein.

As shown in FIG. 10A, apparatus 1000 includes a magnetic tape head 1002 which further includes a module 1004. It should be noted that magnetic tape heads are unique in that magnetic tape transducer widths are currently about 30 to about 50 times greater than transducer widths for HDD heads. Moreover, in preferred embodiments, the module 1004 of tape head 1002 includes an array of read transducers. Accordingly, the module 1004 includes a plurality of tunnel valve read transducers 1006 for reading data from data tracks on a magnetic tape. As shown, the plurality of tunnel valve read transducers 1006 are arranged in an array which extends along a longitudinal axis 1008 of the module 1004. Furthermore, in some approaches the module 1004 may further include tunnel valve transducers which are positioned and configured to read data written to servo patterns (e.g., see servo readers 212 of FIG. 2B-2C).

The plurality of tunnel valve read transducers 1006 also share a common media-facing surface 1005 of the module 1004. According to the present embodiment, no write transducers are present on the common media-facing surface 1005, or even the module 1004 itself. However, it should be noted that in other embodiments, an array of write transducers may also be included on module 1004, on an adjacent module, etc., e.g., as shown in any one or more of FIGS. 2A-7. Moreover, in some embodiments, the apparatus 1000 may include a drive mechanism for passing a magnetic medium over the magnetic tape head, e.g., see 100 of FIG. 1A, and a controller electrically coupled to the sensor, e.g., see 128 of FIG. 1A.

Looking now to FIG. 10B, a partial detailed view of the tape facing surface of one of the tunnel valve read transducers 1006 in FIG. 10A is shown according to one embodiment. It should be noted that although a partial detailed view of only one of the tunnel valve read transducers 1006 is shown, any one or more of the tunnel valve read transducers 1006 included on module 1004 of FIG. 10A may have the same or a similar construction.

As shown, the tunnel valve read transducer 1006 includes a sensor structure 1012 as well as upper and lower magnetic shields 1014, 1016 respectively, which flank (sandwich) the sensor structure 1012. The separation between the upper and lower magnetic shields 1014, 1016 proximate to the sensor and measured along the intended direction of tape (e.g., media) travel 1050 is preferably less than about 120 nm, but could be lower or higher depending on the embodiment. Moreover, upper and lower electrically conductive, non-magnetic spacer layers 1018, 1020 are positioned between the sensor structure 1012 and the magnetic shields 1014, 1016, respectively. In a preferred embodiment, the electrically conductive, non-magnetic spacer layers 1018, 1020 include iridium, ruthenium, titanium-nitride, etc.

Between the non-magnetic conductive spacer layers 1018, 1020, the sensor structure 1012 includes an antiferromagnetic layer 1022 and has a sensor cap layer 1024. The sensor structure 1012 also preferably has an active TMR region. Thus, the sensor structure 1012 is shown as also including a free layer 1026, a tunnel barrier layer 1028 and a reference layer 1030. According to various embodiments, the free layer 1026, the tunnel barrier layer 1028 and/or the reference layer 1030 may include construction parameters, e.g., materials, dimensions, properties, etc., according to any of the embodiments described herein, and/or conventional construction parameters, depending on the desired embodiment. In exemplary embodiments, the free layer 1026 may include layers of permalloy and/or cobalt-iron. Illustrative materials for the tunnel barrier layer 1028 include amorphous and/or crystalline forms of, but are not limited to, TiOx, MgO and Al$_2$O$_3$.

The tunnel valve read transducer 1006 illustrated in FIG. 10B further includes electrically insulating layers 1034 on opposite sides of the sensor structure 1012. The electrically insulating layers 1034 separate the upper conducting spacer layer 1018 from the lower conducting spacer layer 1020 and the sensor structure 1012 to avoid electrical shorting therebetween. According to some approaches, the thickness $t_1$ of the electrically insulating layers 1034 may be less than about 8 nm, but may be higher or lower depending on the desired embodiment. Moreover, it is preferred that the electrically insulating layers 1034 include a dielectric material.

Figure 10C:
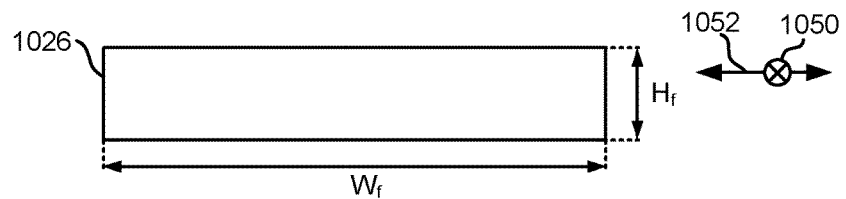
FIG. 10C is a detailed view of the free layer from FIG. 10B shown along a plane perpendicular to the plane of deposition of the free layer, according to one embodiment.

Looking to FIG. 10C, a view of the free layer 1026 of FIG. 10B is shown along a plane perpendicular to the plane of deposition of the free layer 1026. Arrows indicating the cross-track direction 1052 and the intended direction of tape travel 1050 have been added for reference. As shown, the height $H_f$ of the free layer 1026 is less than the width $W_f$ of the free layer 1026. As shown, the height $H_f$ of the free layer 1026 is measured in a direction perpendicular to a media bearing surface of the module shown in FIGS. 10A-10B. According to an illustrative approach, which is in no way intended to limit the invention, the width $W_f$ of the free layer 1026 may be less than about 2 μm, but could be higher or lower depending on the desired approach. As mentioned above, free layer slab dimensions may be able to cause the free layer to form a largely homogeneous single magnetic domain aligned along the cross-track direction as a result of shape anisotropy alone. This may directly result in improved sensor performance and overall increased efficiency of a magnetic head. This is a significant improvement compared to conventional implementations which are unable to implement free layers having a width and height as shown in FIG. 10C.

Figure 10D:
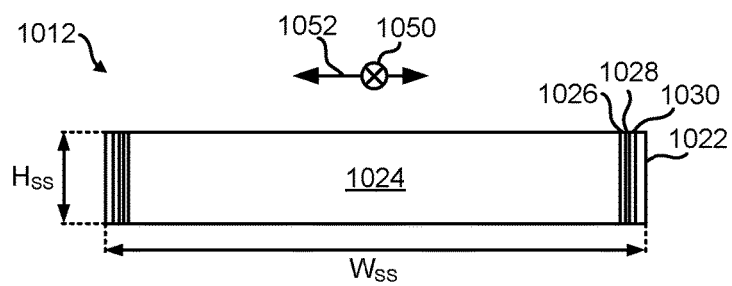
FIG. 10D is a detailed view of the sensor structure from FIG. 10B shown along a plane perpendicular to the plane of deposition of the sensor structure, according to one embodiment.

The general shape of the free layer shown in FIG. 10C may also translate to the height and width of the overall sensor structure 1012 shown in FIG. 10B. Looking to FIG. 10D, a view of the sensor structure 1012 is shown along a plane perpendicular to the plane of deposition thereof (the same plane of view as shown in FIG. 10C). Although the sensor cap layer 1024 is in full view, portions of the other layers are also visible along the cross-track direction 1052 in FIG. 10D due to the sensor structure's flared profile shown in FIG. 10B. As described above for the free layer, it is preferred that the height $H_{SS}$ of the sensor structure 1012 is less than the width $W_{SS}$ of the sensor structure 1012. According to some approaches, the height $H_{SS}$ of the sensor structure 1012 may be less than about 0.8 times the width $W_{SS}$ of the sensor structure 1012. More preferably, in some approaches the height $H_{SS}$ of the sensor structure 1012 may be less than about 0.5 times the width $W_{SS}$ of the sensor structure 1012, but could be higher or lower depending on the desired embodiment. This general shape of the sensor structure 1012 may desirably provide improved sensor performance and overall increased efficiency of a magnetic head as a result of shape anisotropy, e.g., as described above in relation to the height $H_f$ and width $W_f$ of the free layer 1026 in FIG. 10C.

Figure 10E:
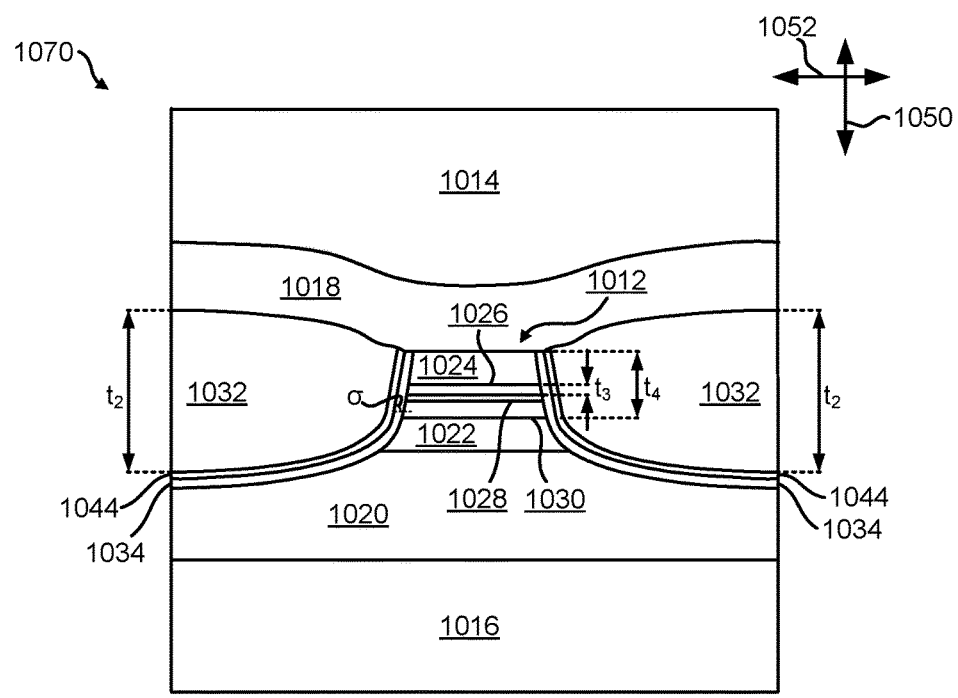
FIG. 10E is a partial detailed tape facing surface view of a tunnel valve read transducer according to one embodiment.

Although tunnel valve read transducers having slab dimensions which form a largely homogeneous single magnetic domain aligned along the cross-track direction of the free layer as a result of shape anisotropy alone are desirable, performance may further be improved by implementing hard bias magnets in some embodiments. As mentioned above, hard bias magnets may be used to further stabilize a free layer and reduce magnetic switching noise. Looking to FIG. 10E, a tunnel valve read transducer 1070 is shown in accordance with one embodiment. As an option, the present tunnel valve read transducer 1070 may be implemented in conjunction with features from any other embodiment listed herein, such as those described with reference to the other FIGS. Specifically, FIG. 10E illustrate variations of the embodiment of FIG. 10B depicting several exemplary configurations within a tunnel valve read transducer 1070. Accordingly, various components of FIG. 10E have common numbering with those of FIG. 10B.

However, such tunnel valve read transducer 1070 and others presented herein may be used in various applications and/or in permutations which may or may not be specifically described in the illustrative embodiments listed herein. Further, the tunnel valve read transducer 1070 presented herein may be used in any desired environment. Thus FIG. 10E (and the other FIGS.) may be deemed to include any possible permutation.

As shown, the tunnel valve read transducer 1070 includes upper and lower shields 1014, 1016, a sensor structure 1012, as well as upper and lower conducting spacer layers 1018, 1020 positioned between the sensor structure 1012 and the magnetic shields 1014, 1016, respectively.

Furthermore, the sensor structure 1012 is sandwiched laterally along the cross-track direction 1052, by a pair of hard bias magnets 1032. In other words, the hard bias magnets 1032 are positioned proximate to a side of the sensor structure 1012 along a cross-track direction 1052 on opposite sides thereof. The hard bias magnets 1032 may include cobalt-platinum, cobalt-platinum-chrome, etc., or any other hard bias materials which would become apparent to one skilled in the art after reading the present description.

Moreover, electrically insulating layers 1034 are included on opposite sides of the sensor structure 1012. More specifically, an electrically insulating layer 1034 separates each of the hard bias magnets 1032 from the sensor structure 1012 and the lower conducting spacer layer 1020, to avoid electrical shorting therebetween. A seed layer 1044 is also present between each of the hard bias magnets 1032 and the respective electrically insulating layers 1034 which may be used to form hard bias magnets 1032 having an at least partially crystalline composition, e.g., as will be described in further detail below.

Although the insulating layer 1034 is positioned between each of the hard bias magnets 1032 and the sensor structure 1012, each of the hard bias magnets 1032 are preferably magnetically coupled to (e.g., are in magnetic communication with) the free layer 1026 sandwiched therebetween. As would be appreciated by one skilled in the art, magnetic coupling may be achieved between two layers when the layers have proper characteristics, which may include: being positioned sufficiently close to each other, having the proper material composition, having proper dimensions, etc., e.g., as will soon become apparent.

As alluded to above, the construction of the hard bias magnets implemented in a given magnetic tape head were found by the inventors to have a significant impact on the performance of the overall magnetic tape head. The inventors were surprised to discover that by increasing a thickness of the hard bias magnets above what was previously considered to be adequate resulted in a very low incidence of noisy tracks. Previously, it was believed that increasing the thickness of the hard bias layers beyond a certain thickness would actually degrade read performance by causing a detrimental amount of hard bias flux to permeate the free layer, thereby reducing readback signal strengths. In sharp contrast, the improvements included herein were achieved, at least in part, by the increased magnetization from the thicker hard bias magnets effectively stabilizing the magnetic domains of the free layer near the lateral edges thereof. Moreover, magnetic tape heads implementing these thicker hard bias magnets were also discovered to be tolerant to variation in other aspects of the sensor, e.g., such as free layer magnetostriction and/or pinned layer design. Thus, by implementing hard bias magnet structures which go directly against conventional wisdom, the inventors were able to realize significant improvements in the performance of free layers in tunnel valve read transducers.

Figure 12:
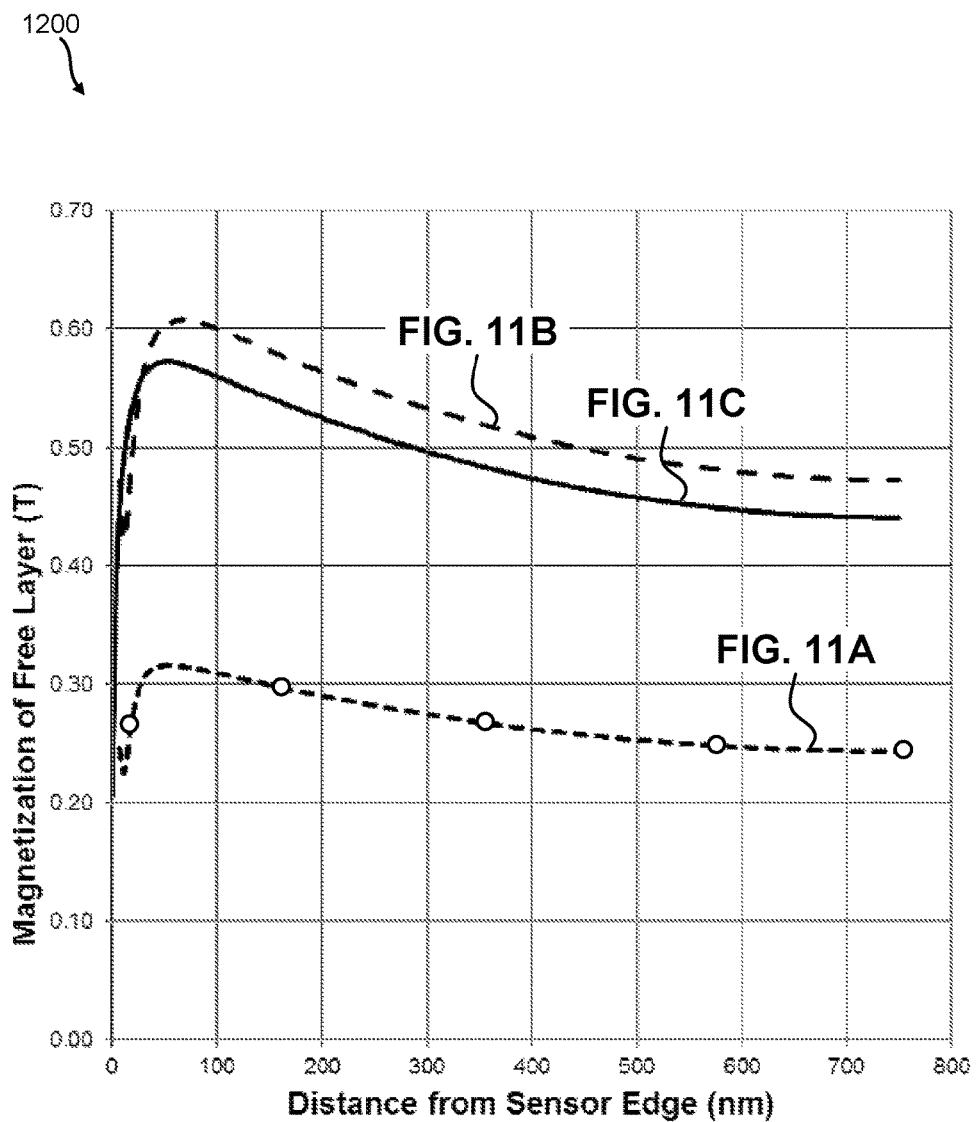
FIG. 12 is a graph plotting the calculated magnetization of the free layer for each of the structures in FIGS. 11A-11C vs. the distance from the sensor edge.

Specifically, referring still to FIG. 10E, the inventors were surprised to discover that implementing hard bias magnets 1032 having a deposition thickness $t_2$ that is 10 or more times greater than a deposition thickness $t_3$ of the free layer 1026 results in substantial improvements to the magnetization stability of the free layer 1026 (e.g., see graph 1200 of FIG. 12 below). Without wishing to be bound by any theory, the inventors believe that this surprising result is achieved because the thicker hard bias magnets 1032 are able to overcome the loss of field at the ends of the hard bias magnets 1032 due to magnetic flux leakage into the magnetic shields 1014, 1016 over the relatively large dimensions (e.g., large widths) of the tape transducer layers. It follows that, a deposition thickness $t_2$ of each of the hard bias magnets 1032 at about a thickest portion thereof is preferably at least 8 times greater, more preferably at least 10 times greater than a deposition thickness $t_3$ of the free layer 1026. In some embodiments, the thickness of the hard bias magnets may be expressed as a multiple of the thickness of the free layer times the ratio of the magnetic moment of the free layer divided by the magnetic moment of the hard bias magnets. Accordingly, the inventors found that while conventionally this ratio is about 8, a ratio of about 16 may be implemented for stabilizing the free layer. According to one approach, a thickness of the hard bias magnets at a thickest portion thereof may be at least 12 times greater than a thickness of the free layer times a ratio of the magnetic moment of the free layer divided by the magnetic moment of the respective hard bias magnet. According to another approach, the deposition thickness $t_2$ of each of the hard bias magnets 1032 at about a thickest portion thereof may be about 65 nm, while the deposition thickness $t_3$ of the free layer 1026 is about 6.5 nm. In preferred approaches, the deposition thickness $t_3$ of the free layer 1026 is at least 4 nm. However, it should be noted that the thickness $t_2$ of each of the hard bias magnets 1032 at about a thickest portion thereof may vary, e.g., depending on the material composition of the layer.

Moreover, the deposition thickness of each of the hard bias magnets 1032 may diminish toward the free layer 1026, thereby resulting in a tapered profile of the hard bias magnets 1032 toward the free layer 1026. According to an exemplary approach, the taper length of the hard bias magnets 1032 may be less than the maximum thickness $t_2$ of each of the hard bias magnets 1032. However, a deposition thickness $t_4$ of each of the hard bias magnets 1032 at an edge closest to the free layer 1026 is preferably at least greater than the deposition thickness $t_3$ of the free layer 1026. As a result, a significant amount of hard bias material is present at the interface between each of the hard bias magnets 1032 and the free layer 1026, thereby increasing the total amount of flux density that may be produced from the edge of the hard bias magnets 1032.

It is also preferred that the a first portion of each of the hard bias magnets 1032 is positioned below a lower surface of the free layer 1026, and a second portion of each of the hard bias magnets 1032 is positioned above an upper surface of the free layer 1026. Referring to the present description, the terms "lower"/"below" and "upper"/"above" are intended to be relative to each other along a deposition direction of the layers, the deposition direction being parallel to the intended direction of tape travel 1050 in the present embodiment. In other words, it is desirable that the edge of each of the hard bias magnets 1032 facing the free layer 1026 overlaps the free layer 1026 along the intended direction of tape travel 1050, and may even be centered relative to the free layer 1026, e.g., as shown in FIG. 10E.

The edge of each of the hard bias magnets 1032 closest to the free layer 1026 preferably has about a vertical profile. In other words, it is desirable that the edge of each of the hard bias magnets 1032 closest to the free layer 1026 is oriented at an angle σ relative to a plane of deposition of the free layer, where the angle σ may be in a range from about 65° to about 105°, more preferably in a range from about 70° to about 95°, ideally in a range from about 70° to about 90°. By implementing hard bias magnets 1032 having an edge closest to the free layer 1026 that is sufficiently vertical relative to a horizontally-oriented plane of deposition of the free layer, magnetization of the free layer 1026 is significantly improved as a result (e.g., see graph 1200 of FIG. 12 below). However, the angle σ of one or more of the hard bias magnets 1032 may be higher or lower depending on the desired embodiment. Furthermore, a free layer 1026 having edges facing the hard bias magnets which are about perpendicular (e.g., between about 80° and about 100°) relative to a plane of deposition thereof may also improve magnetization of the free layer 1026, as will soon become apparent.

It should be noted that in other embodiments, the shape and thickness of the hard bias magnets 1032 may be selected to result in maximum coupling of magnetic flux into the free layer 1026. Accordingly, depending upon the thickness $t_3$ of the free layer 1026, the magnetic flux from the hard bias magnets 1032 may serve to reduce the output of the free layer 1026 in response to recorded data on a tape. While not ideal in terms of signal output, such designs may be more magnetically stable.

Figure 11A:
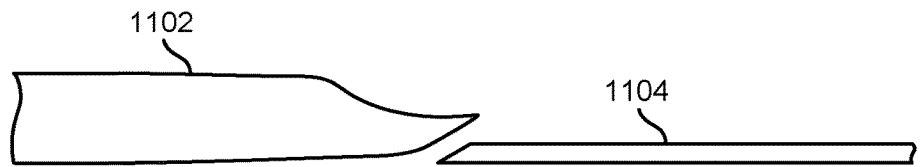
FIG. 11A is a partial detailed view of a hard bias structure and a free layer according to the prior art.
Figure 11B:
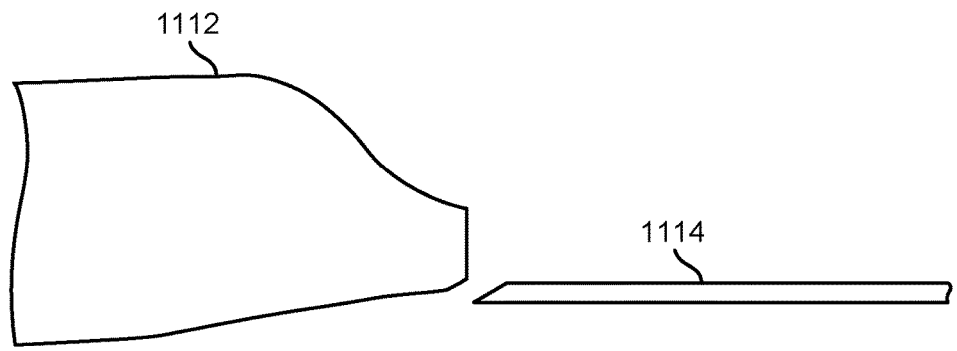
FIG. 11B is a partial detailed view of a hard bias magnet and a free layer according to one embodiment.
Figure 11C:
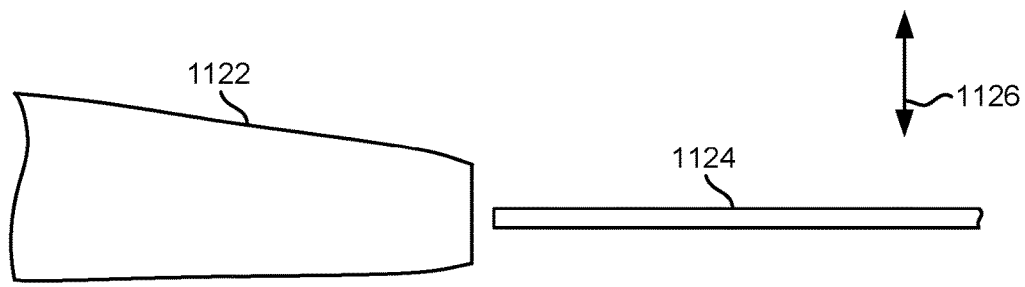
FIG. 11C is a partial detailed view of a hard bias magnet and a free layer according to one embodiment.

Referring momentarily to FIGS. 11A-11C, three different hard bias magnet configurations are illustrated relative to a free layer. Moreover, graph 1200 of FIG. 12 includes plots showing magnetization of the free layer vs. the distance from the sensor edge (along the width of the free layer) for each of the three configurations in FIGS. 11A-11C. It should be noted that the plots included in graph 1200 were obtained using finite element analysis, and well-known materials properties for the free layer and hard bias magnets, while keeping the variables therebetween equal, other than the geometric differences of the hard bias and free layers as described below.

Looking first to FIG. 11A, the hard bias structure 1102 included therein is consistent with conventional hard bias structures. As shown, the hard bias structure 1102 is only slightly thicker than the free layer 1104, and the hard bias structure 1102 oriented almost entirely above the free layer 1104. As illustrated by the corresponding plot in graph 1200 of FIG. 12, the resulting magnetization of the free layer is adversely low. Moreover, the magnetization of the free layer makes an adverse dip before rising to a maximum value at the distance of about 50 nm.

Conversely, FIG. 11B includes a hard bias magnet 1112 which has a maximum thickness that is much greater than the thickness of the free layer 1114, e.g., according to any of the approaches included herein. The corresponding plot in graph 1200 of FIG. 12 illustrates that the increased thickness of the hard bias magnet 1112 desirably causes a significant increase to the magnetization of the free layer 1114, thereby improving the magnetic stability of the free layer 1114, particularly at its lateral edge. Although the resulting increase to the magnetization of the free layer 1114 is desirable, the plot in graph 1200 corresponding to the structure of FIG. 11B still includes an undesirable dip before rising to a maximum value at the distance of about 75 nm.

However, as described above, the inventors discovered that by orienting the hard bias magnet such that it is about centered with the free layer along the deposition direction and/or by making an edge of the hard bias magnet facing the free layer about perpendicular to the plane of deposition, even greater improvements may be achieved. Accordingly, the embodiment illustrated in FIG. 11C illustrates a hard bias magnet 1122 which is about centered with the free layer 1124 along the deposition direction 1126. The hard bias magnet 1122 also has an edge facing the free layer which is about perpendicular to the plane of deposition (or about parallel to the deposition direction 1126). Moreover, by forming the free layer 1124 such that an edge thereof facing the hard bias magnet 1122 is also about perpendicular to the plane of deposition, performance may even further be improved. As a result, the corresponding plot in graph 1200 of FIG. 12 indicates significant improvements to the magnetization of the free layer relative to what was conventionally achievable (see plot for FIG. 11A), while also eliminating the previously experienced dip in the magnetization of the free layer. It follows that various embodiments described herein were surprisingly discovered by the inventors to provide a sufficient magnetic field to stabilize the free layer and reduce magnetic noise.

Referring again to FIG. 10E, the hard bias magnets 1032 may be formed to have different dimensions (e.g., a different structure) according to various approaches. However, according to preferred approaches, the hard bias magnets 1032 included herein are formed such that the magnetic field produced by each of the hard bias magnets 1032 is close to a maximum achievable value. In other words, each of the hard bias magnets 1032 is preferably characterized as producing a magnetic field that is greater than or equal to 90% of a maximum achievable magnetic field for the material of the respective hard bias magnet 1032. Producing a magnetic field close to the maximum achievable magnetic field for the material of the respective hard bias magnet 1032 may be accomplished by implementing favored (e.g., ideal) processing steps during the manufacture thereof, e.g., such as ensuring proper seed layer templated growth, performing a proper annealing process on the resulting structure, etc.

Figure 10F:
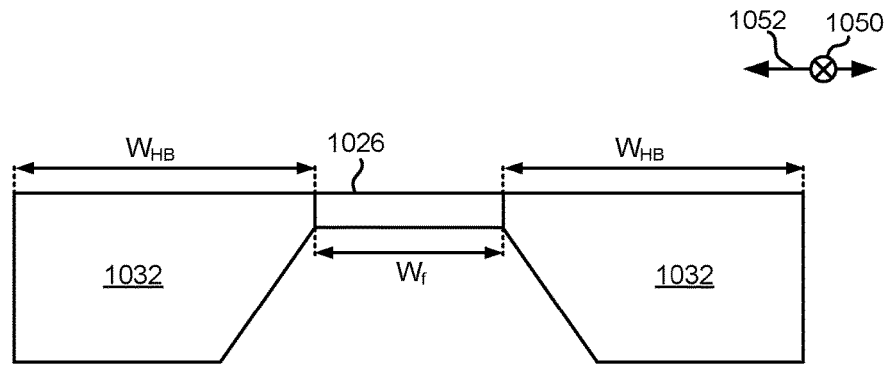
FIG. 10F is a detailed view of the free layer and hard bias magnets from FIG. 10E shown along a plane perpendicular to the plane of deposition of the free layer and the hard bias magnets, according to one embodiment.

Referring momentarily to FIG. 10F, a view of the hard bias magnets 1032 and free layer 1026 of FIG. 10E are shown along a plane perpendicular to the plane of deposition of the hard bias magnets 1032 and the free layer 1026. Arrows indicating the cross-track direction 1052 and the intended direction of tape travel 1050 have been added for reference. As shown, the width $W_{HB}$ of the hard bias magnets 1032 are measured in the cross-track direction 1052. Moreover, according to preferred embodiments, the width of the hard bias magnets 1032 is at least about 0.3 µm, but could be higher or lower depending on the desired embodiment.

Referring again to FIG. 10E, according to some approaches, each of the hard bias magnets 1032 may be at least partially crystalline. In other words, the hard bias magnets 1032 may be formed in such a way that the material composition thereof is crystalline in nature.

As previously mentioned, the hard bias magnets 1032 in FIG. 10E may have an at least partially crystalline material composition. A hard bias magnet 1032 having a crystalline material composition may be formed by first depositing a seed layer 1044, and then forming the hard bias magnet layer 1032 from the seed layer 1044. By using the seed layer 1044 as a base, the hard bias magnet layer 1032 may desirably form such that the material composition thereof is crystalline in nature.

Accordingly, the hard bias magnet 1032 may be formed in full above the seed layer in some approaches. However, crystalline structure growth may become less uniform as the hard bias magnet becomes thicker, and the distance from the seed layer increases. Thus, in some approaches, additional seed layers may be implemented to avoid structural degradations caused by a loss of templating. In one such approach, a hard bias magnet may be a split hard bias structure which includes two seed layers, each of the seed layers having an at least partially crystalline structure formed thereabove.

Figure 10G:
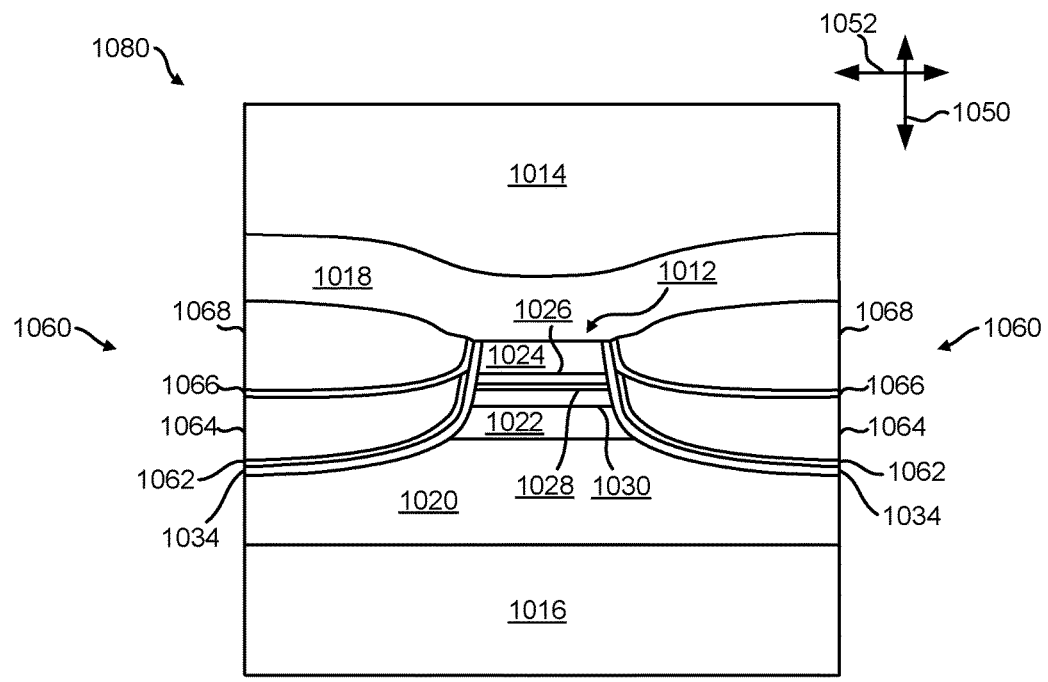
FIG. 10G is a partial detailed tape facing surface view of a tunnel valve read transducer according to one embodiment.

Referring momentarily now to FIG. 10G, a tunnel valve read transducer 1080 having a split hard bias magnets 1060 having a crystalline material composition may be formed by first depositing a seed layer 1062, and then forming a first hard bias layer 1064 from the seed layer 1062, e.g., as described above. Once a portion, e.g., about one half, of the total hard bias magnet 1060 has been formed, formation of the first hard bias layer 1064 may be stopped, and a second seed layer 1066 is deposited on an upper surface of the first hard bias layer 1064 as shown. Thereafter, a second hard bias layer 1068 may be formed from the second seed layer 1066. The first and second hard bias layers 1064, 1068 may be formed using a same or similar materials, e.g., depending on the desired embodiment. It should be additionally noted that FIG. 10G illustrates variations of the embodiment of FIG. 10E depicting an exemplary configuration within a magnetic tape head 1002. Accordingly, various components of FIG. 10G also have common numbering with those of FIG. 10E.

As mentioned above, shape anisotropy achieved by free layer dimensions and/or dimensions of the sensor structure as a whole were able to improve overall performance of various tunnel valve read transducers described herein. Furthermore, hard bias magnets according to various embodiments described herein were surprisingly discovered by the inventors to provide a magnetic field that more effectively stabilizes the free layer. Without wishing to be bound by any theory, the inventors believe that this surprising result is achieved because the thicker hard bias magnets are able to overcome the loss of field at the ends of the hard bias magnets due to magnetic flux leakage into the magnetic shields over the larger dimensions (e.g., width and/or length) of the tape transducer. Accordingly, some of the embodiments included herein are successfully able to significantly reduce magnetic noise in magnetic tape heads conventionally caused by thermally and/or magnetically induced switching of unstable domains in a tunnel valve free layer.

It will be clear that the various features of the foregoing systems and/or methodologies may be combined in any way, creating a plurality of combinations from the descriptions presented above.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a module; and
a plurality of tunnel valve read transducers arranged in an array extending along the module,
wherein each of the tunnel valve read transducers includes:
a sensor structure having a cap layer, a free layer, a tunnel barrier layer, a reference layer and an antiferromagnetic layer;
an upper magnetic shield;
a lower magnetic shield;
an upper conducting spacer layer between the sensor structure and the upper magnetic shield;
a lower conducting spacer layer between the sensor structure and the lower magnetic shield; and
electrically insulating layers on opposite sides of the sensor structure,
wherein a height of the free layer measured in a direction perpendicular to a media bearing surface of the module is less than a width of the free layer measured in a cross-track direction perpendicular to an intended direction of media travel.

2. The apparatus as recited in claim 1, wherein the height of the sensor structure is less than 0.8 times the width of the sensor structure.

3. The apparatus as recited in claim 1, wherein the electrically insulating layers separate the upper conducting spacer layer from the lower conducting spacer layer and from the opposite sides of the sensor structure.

4. The apparatus as recited in claim 1, wherein the width of the free layer is less than 2 μm.

5. The apparatus as recited in claim 1, wherein a separation between the upper and lower magnetic shields proximate to the sensor and along the intended direction of media travel is less than 120 nm.

6. The apparatus as recited in claim 1, wherein each of the tunnel valve read transducers includes: a hard bias magnet, wherein the hard bias magnet is positioned proximate to a side of the sensor structure along a cross-track direction, wherein the electrically insulating layers separate the hard bias magnet from the sensor structure and the lower conducting spacer layer.

7. The apparatus as recited in claim 6, wherein a thickness of the electrically insulating layers is less than 8 nm.

8. The apparatus as recited in claim 6, wherein the electrically insulating layers include a dielectric material.

9. The apparatus as recited in claim 6, wherein a thickness of the free layer is at least 4 nm.

10. The apparatus as recited in claim 6, wherein a thickness of the hard bias magnet at a thickest portion thereof is at least 8 times greater than a thickness of the free layer.

11. The apparatus as recited in claim 6, wherein a thickness of the hard bias magnet at a thickest portion thereof is at least 12 times greater than a thickness of the free layer times a ratio of a magnetic moment of the free layer divided by a magnetic moment of the hard bias magnet.

12. The apparatus as recited in claim 6, wherein a thickness of the hard bias magnet at an edge closest to the free layer is greater than the thickness of the free layer.

13. The apparatus as recited in claim 12, wherein a first portion of each of the hard bias magnet is positioned below a lower surface of the free layer and a second portion of the hard bias magnet is positioned above an upper surface of the free layer, wherein the upper and lower surfaces are opposite each other along a deposition direction.

14. The apparatus as recited in claim 12, wherein an edge of the hard bias magnet closest to the free layer is oriented between 70° and 90° relative to a plane of deposition of the free layer.

15. The apparatus as recited in claim 6, wherein a seed layer is present between the hard bias magnet and the electrically insulating layers, wherein the hard bias magnet is at least partially crystalline.

16. The apparatus as recited in claim 6, wherein a width of the hard bias magnet measured in the cross-track direction is at least 0.3 μm.

17. The apparatus as recited in claim 6, wherein the hard bias magnet is characterized by having a magnetic field produced by the hard bias magnet that is greater than or equal to 90% of a maximum achievable magnetic field for a material of the hard bias magnet.

18. The apparatus as recited in claim 6, wherein the hard bias magnet is a split hard bias structure having two seed layers, each of the seed layers having an at least partially crystalline structure formed thereabove.

19. The apparatus as recited in claim 1, wherein the plurality of tunnel valve read transducers share a common media-facing surface of the module.

20. The apparatus as recited in claim 1, comprising:
a drive mechanism for passing a magnetic medium over the tunnel valve read transducers; and
a controller electrically coupled to the tunnel valve read transducers.

\* \* \* \* \*